(12) United States Patent
Barsoum

(10) Patent No.: US 6,947,530 B1
(45) Date of Patent: Sep. 20, 2005

(54) ADAPTIVE PILOT TONE LOCATION IN A TRANSMISSION SYSTEM

(75) Inventor: Maged F. Barsoum, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 378 days.

(21) Appl. No.: 10/292,471

(22) Filed: Nov. 13, 2002

(51) Int. Cl.[7] .............................................. H04L 7/06
(52) U.S. Cl. ..................... 379/93.08; 455/62; 375/222; 375/227; 375/347; 375/364
(58) Field of Search ............................... 375/222, 227, 375/364, 347; 379/93.08; 455/62

(56) References Cited

U.S. PATENT DOCUMENTS 5,867,528 A * 2/1999 Verbueken .................. 375/222

* cited by examiner

Primary Examiner—Sinh Tran
Assistant Examiner—Daniel Swerdlow
(74) Attorney, Agent, or Firm—Harrity & Snyder LLP

(57) ABSTRACT

A system selects a tone at which a pilot sequence is to be transmitted. The system includes logic configured to adaptively select a tone on which the pilot sequence is transmitted based one or more conditions in the transmission system.

12 Claims, 5 Drawing Sheets

ADAPTIVE PILOT TONE LOCATION IN A TRANSMISSION SYSTEM

FIELD OF THE INVENTION

The present invention relates generally to data communications and, more particularly, to systems and methods for dynamically adjusting a pilot tone location based on system conditions.

BACKGROUND OF THE INVENTION

In many discrete multi-tone (DMT) systems, a pilot sequence, consisting, for example, of amplitude and phase information, is used for timing recovery. Typically, the pilot sequence is transmitted at a fixed location (e.g., fixed frequency). If the transmission system includes channels that could have different frequency responses with unknown notches, using a fixed location for the pilot sequence could be problematic. For instance, the frequency of the pilot sequence could correspond to a deep notch in the channel frequency response, causing the pilot sequence to become significantly distorted prior to reception.

One attempt to solving the above problem is to use more than one tone for transmitting the pilot sequence. This approach, however, reduces the maximum possible data throughput in the system and continues to run the risk that all frequencies of the pilot sequences continue to correspond to channel notches.

Therefore, there exists a need for improved techniques for transmitting pilot sequences.

SUMMARY OF THE INVENTION

Systems and methods consistent with the present invention address this and other needs by improving the way in which pilot sequences are transmitted.

In accordance with the purpose of this invention as embodied and broadly described herein, a system for transmitting a pilot sequence in a transmission system is provided. The system includes logic configured to adaptively select the tone on which the pilot sequence is transmitted based one or more conditions in the transmission system.

In another implementation consistent with the present invention, a method for selecting a tone for transmitting a pilot sequence is provided. The method includes estimating a signal-to-noise ratio for each tone in a group of tones, selecting an optimum tone based on the signal-to-noise ratios, and transmitting the pilot sequence on the selected optimum tone.

In yet another implementation consistent with the present invention, a method for selecting a tone at which a pilot sequence is to be transmitted is provided. The method includes receiving signals via a group of tones at a first device, estimating a signal-to-noise ratio for each tone in the group of tones, and selecting a tone at which the pilot sequence is to be transmitted based on the signal-to-noise ratios.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and their equivalents.

Systems and methods consistent with the present invention provide an adaptive pilot sequence location technique that greatly improves the chances that transmitted pilot sequences will be used effectively for timing recovery.

Exemplary System

Figure 1:
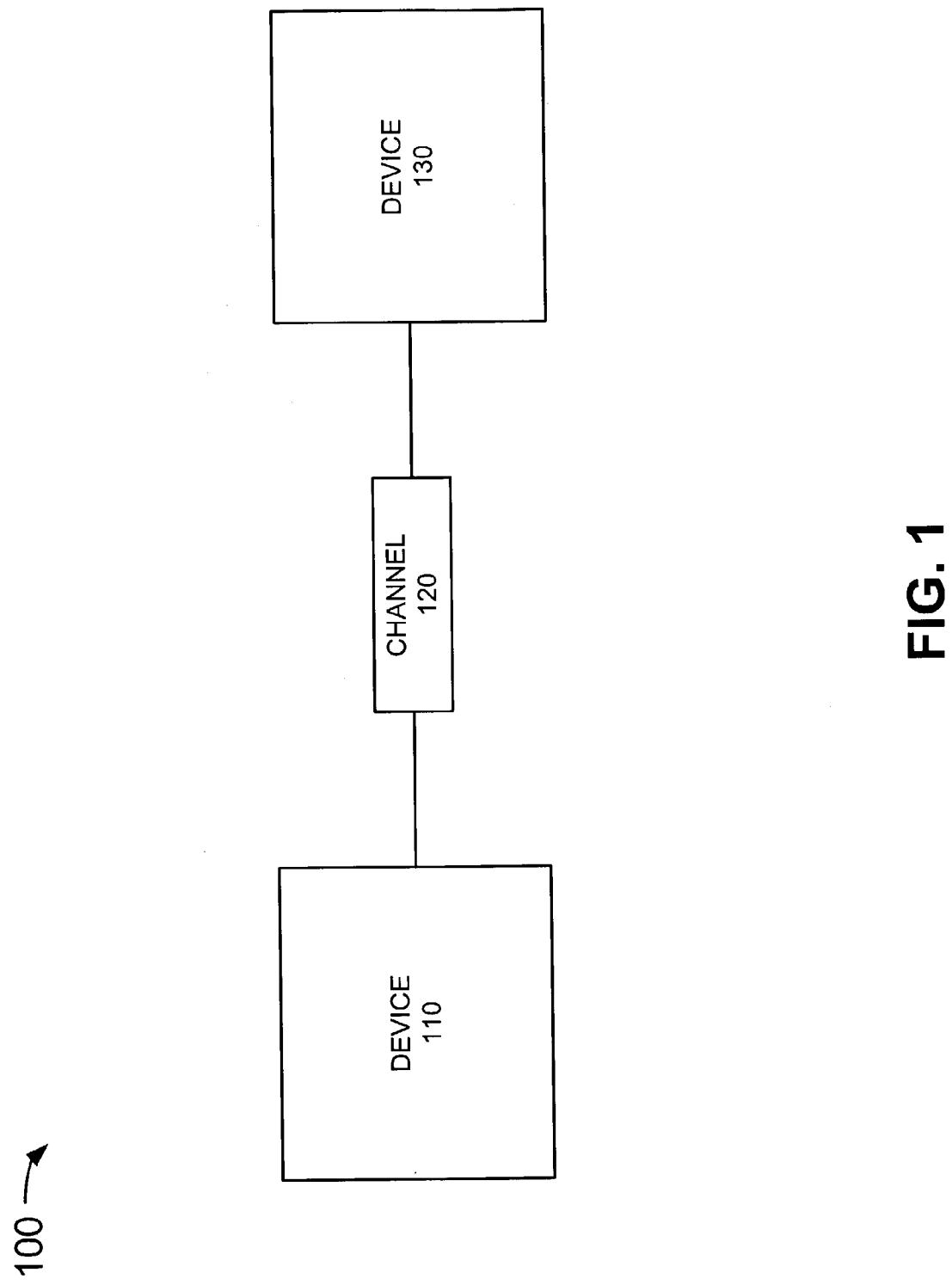
FIG. 1 illustrates an exemplary network in which systems and methods consistent with the principles of the present invention may be implemented.

FIG. 1 illustrates an exemplary network 100 in which systems and methods consistent with the principles of the present invention may be implemented. As illustrated, network 100 may include two devices 110 and 130 interconnected via a transmission channel 120. Devices 110 and 130 may include one or more devices capable of transmitting and/or receiving data via channel 120. For example, devices 110 and 130 may include some type of computer device (e.g., a desktop computer), a modem, a router, or the like. Channel 120 transports signals between device 110 and device 130. Channel 120 may be a wired or wireless transmission channel. The number of components illustrated in FIG. 1 is provided for simplicity. A typical network may include more devices and transmission channels than illustrated in FIG. 1.

Figure 2:
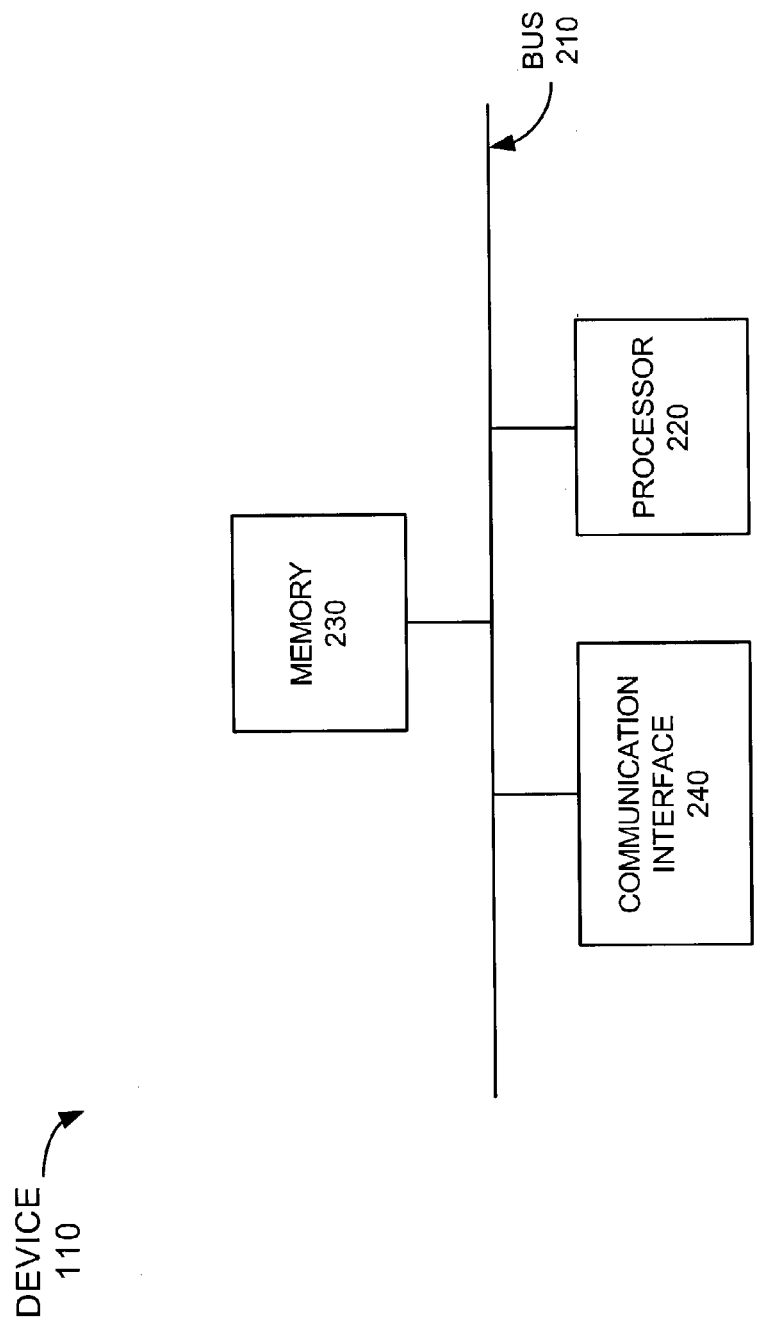
FIG. 2 illustrates an exemplary configuration of the device of FIG. 1 in an implementation consistent with the present invention.

FIG. 2 illustrates an exemplary configuration of device 110 of FIG. 1 in an implementation consistent with the present invention. It will be appreciated that device 130 may be similarly configured. As illustrated, device 110 may include a bus 210, a processor 220, a memory 230, and a communication interface 240. Device 110 may further include other components (not shown) that aid in the reception, transmission, and/or processing of data. Bus 210 permits communication among the components of device 110.

Processor 220 may include any type of conventional processor or microprocessor that interprets and executes instructions. Memory 230 may include a random access memory (RAM) or another type of dynamic storage device that stores information and instructions for execution by processor 220; a read only memory (ROM) or another type of static storage device that stores static information and instructions for use by processor 220; and/or some type of magnetic or optical recording medium and its corresponding drive. Communication interface 240 may include any transceiver-like mechanism that enables device 110 to communicate with other devices and/or systems, such as device 130, via transmission channel 120.

Device 110 may implement the functions described below in response to processor 220 executing software instructions contained in a computer-readable medium, such as memory 230. A computer-readable medium may be defined as one or more memory devices and/or carrier waves. In alternative embodiments, hardwired circuitry may be used in place of or in combination with software instructions to implement the present invention. Thus, the present invention is not limited to any specific combination of hardware circuitry and software.

Figure 3:
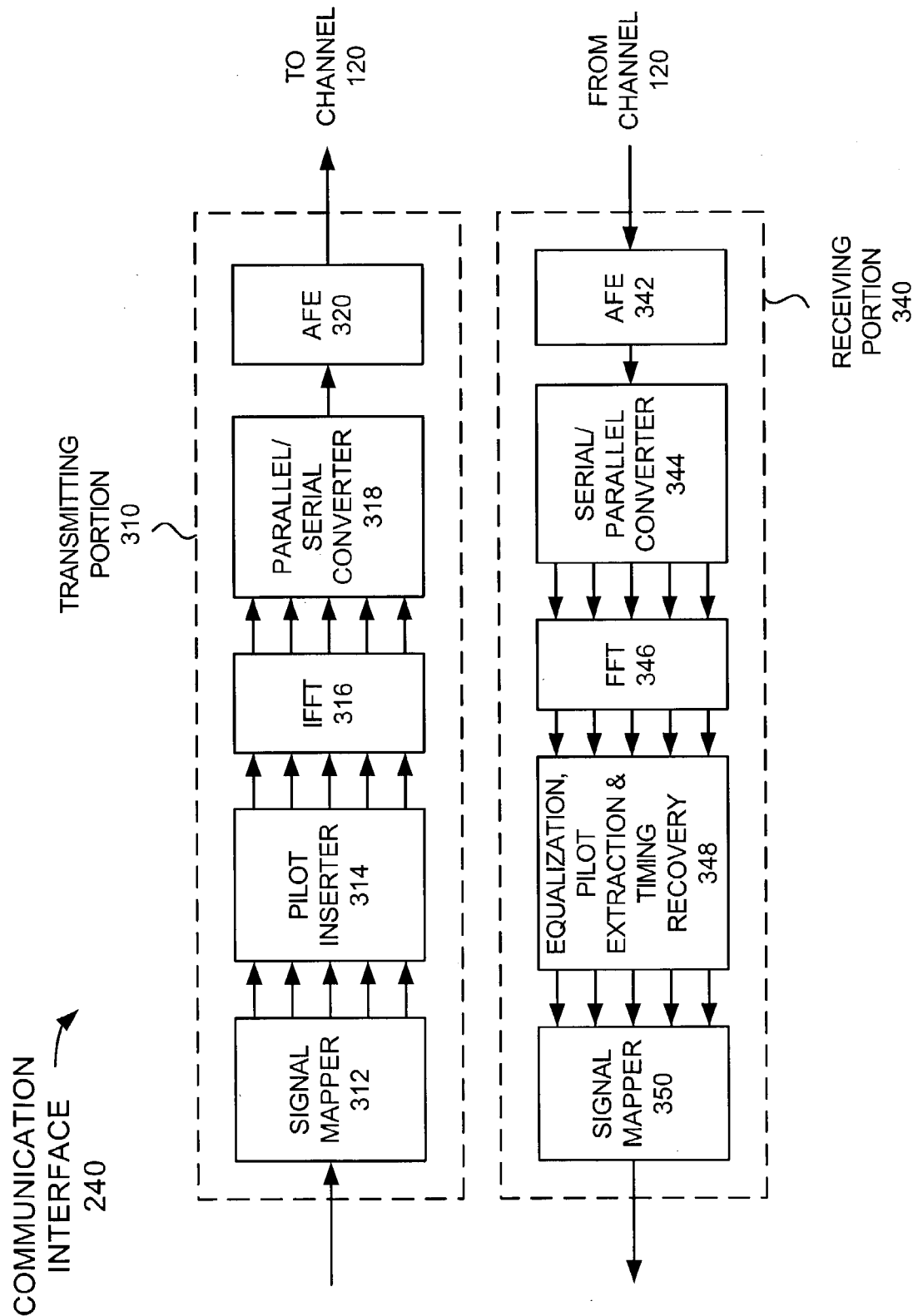
FIG. 3 illustrates an exemplary configuration of the communication interface of FIG. 2 in an implementation consistent with the principles of the invention.

FIG. 3 illustrates an exemplary configuration of communication interface 240 of FIG. 2 in an implementation consistent with the principles of the invention. As illustrated, communication interface 240 may include a transmitting portion 310 and a receiving portion 340. Transmitting portion 310 acts to transmit data from device 110 to channel 120, while receiving portion 340 acts to receive data from channel 120.

Transmitting portion 310 may include a signal mapper 312, a pilot inserter 314, an inverse Fast Fourier Transform (IFFT) 316, a parallel-to-serial converter 318, and an analog front end (AFE) unit 320. Signal mapper 312 may receive data bits from, for example, processor 220, and organize the bits into groups. Signal mapper 312 may encode or "map" the bits according to a quadratic amplitude modulation (QAM) protocol by representing each grouping of bits with a respective discrete tone. In one implementation consistent with the principles of the invention, signal mapper 312 may represent each grouping of bits assigned to each corresponding tone by a complex number (e.g., a "constellation point") containing an amplitude and phase of that particular tone.

Pilot inserter 314 may receive the complex numbers of every tone and insert a pilot sequence at, as will be described in detail below, an optimum pilot tone location. As will be appreciated, the pilot sequence is added to the data transmission for timing recovery purposes. IFFT 316 may convert the tones from the pilot inserter 314, which are in the frequency-domain, into time-domain waveforms. Parallel-to-serial converter 318 may insert a guard band, called a "cyclic-prefix," in the output of IFFT 316 to eliminate the effects of Inter Symbol Interference (ISI). Parallel-to-serial converter 318 may also convert the parallel signals received from IFFT 316 into a serial signal. AFE 320 may perform digital-to-analog (D/A) conversion and forward the resulting analog signal to channel 120.

Receiving portion 340 may include an AFE unit 342, a serial-to-parallel converter 344, a FFT 346, an equalization, pilot extraction, and timing recovery unit 348, and a signal mapper 350. AFE 342 may convert an analog signal received from channel 120 to a digital signal in a well-known manner. Serial-to-parallel converter 344 may convert the digital signal from AFE 342 to a parallel signal. Before sending the parallel signal to FFT 346, serial-to-parallel converter 344 may remove the cyclic prefix from the signal. FFT 346 may transform the signal from a time-domain based signal into a frequency-domain signal containing amplitude and phase information for each tone. It will be appreciated that due to attenuation and phase distortion that invariably occurs when transmitting over a transmission channel, such as transmission channel 120, the result from FFT 346 may no longer match the originally transmitted phase and amplitude. Therefore, equalization, pilot extraction, and timing recovery unit 348 may reverse the effects of amplitude and phase distortion and remove the pilot sequence from the received signal. In addition, equalization, pilot extraction, and timing recovery unit 348 accounts for the difference in the sampling clock between the transmitting device and receiving device. Signal mapper 350 may decode (or "de-map") the signal back into its original form.

Exemplary Processing

Figure 4:
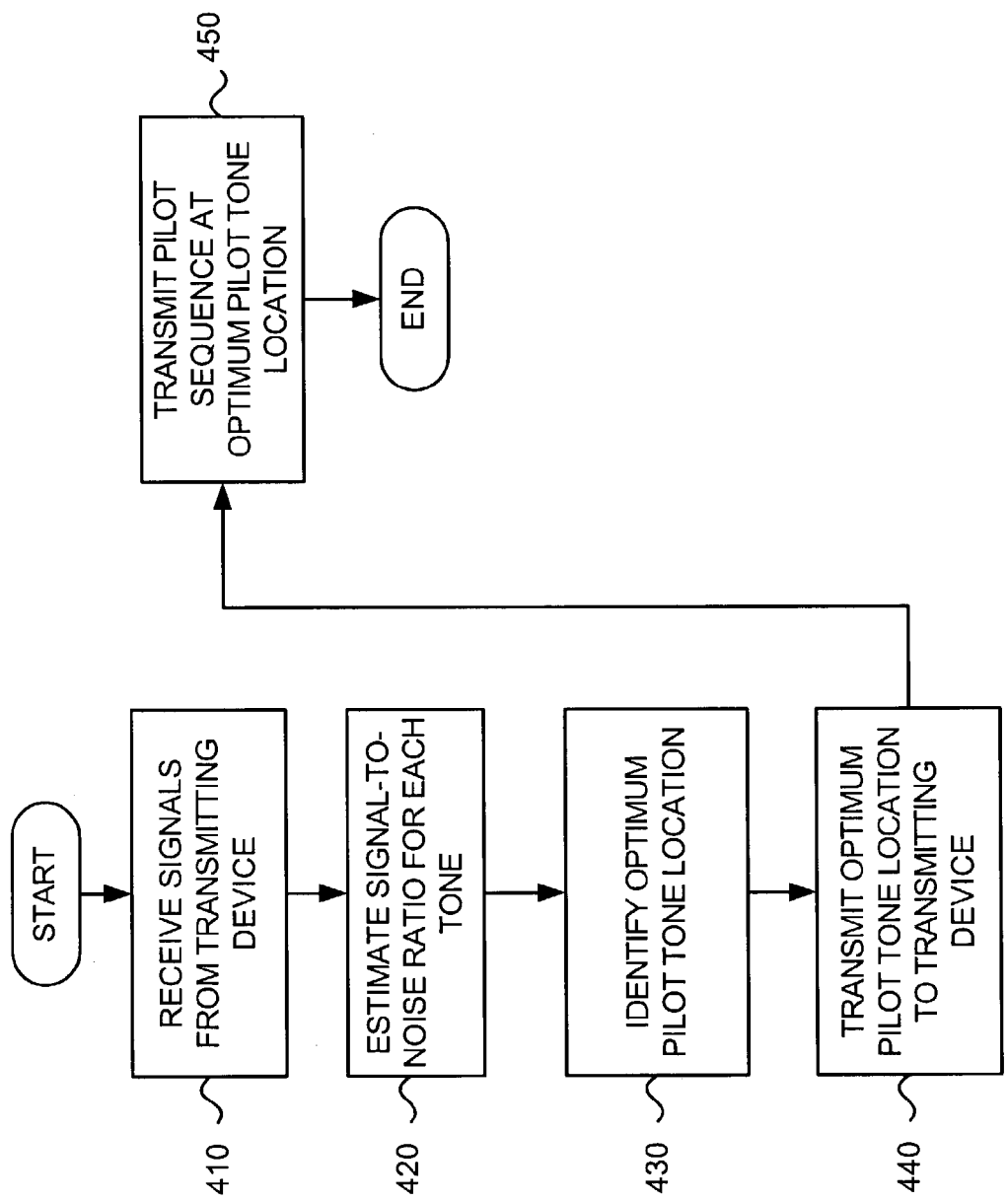
FIG. 4 illustrates an exemplary process for transmitting signals in a network in an implementation consistent with the principles of the present invention.

Due to network conditions, such as channel distortion, it may be desirable to change the tone at which the pilot sequence is transmitted. FIG. 4 illustrates an exemplary process for transmitting signals in a network in an implementation consistent with the principles of the present invention. Processing may begin with a device, such as device 110, receiving signals from another device, such as device 130 during part of a training process (act 410). It will be appreciated that during this training period and prior to data transmission, devices 110 and 130 may exchange signals (e.g., handshaking messages) to learn about each other, select a data rate, and decide how the foregoing data transmissions will be performed.

During the training period, device 110 may estimate a signal-to-noise ratio for each received tone (act 420). Once the signal-to-noise ratios have been determined, device 110 may identify an optimum pilot tone location (act 430). Device 110 may apply the following function to each tone to determine a function value:

Function value=Signal-to-Noise Ratio×(Tone Frequency)$^2$, where the Signal-to-Noise Ratio represents the absolute value of the signal-to-noise ratio for a particular tone and where the Tone Frequency represents the frequency for that particular tone. Device 110 may then select the tone associated with the maximum function value as the optimum pilot tone. The selected optimum tone may then be used for the pilot sequence because it provides optimized timing recovery performance.

As an example, assume that a system includes seven tones, having frequencies of 0 MHz, 1 MHz, 2 MHz, 3 MHz, 4 MHz, 5 MHz, and 6 MHz, respectively, and signal-to-noise ratios of 20 (13 dB), 10 (10 dB), 12 (10.79 dB), 14 (11.46 dB), 13 (11.14 dB), 7 (8.45 dB), and 5 (6.99 dB), respectively. By applying the above function, tone 0 would have a function value of 0, tone 1 would have a function value of 10, tone 2 would have a function value of 48, tone 3 would have a function value of 126, tone 4 would have a function value of 208, tone 5 would have a function value of 175, and tone 6 would have a function value of 180. In this example, device 110 would select tone 4 as the optimum pilot tone since this tone is associated with the maximum function value.

One skilled in the art will appreciate that the above-described function is purely exemplary. Other functions or other functions of the above function may alternatively be used for selecting an optimum pilot tone.

Once an optimum tone has been selected, device 110 may transmit the location of this optimum tone (e.g., the frequency associated with this tone) to device 130 as part of the handshaking/training protocol (act 440). Device 130 may then transmit pilot sequences to device 110 at the optimum tone (act 450). While described as occurring during the training session, implementation consistent with the present invention may alternatively (or in addition) be performed during a data transmission session.

Alternative Implementation

Figure 5:
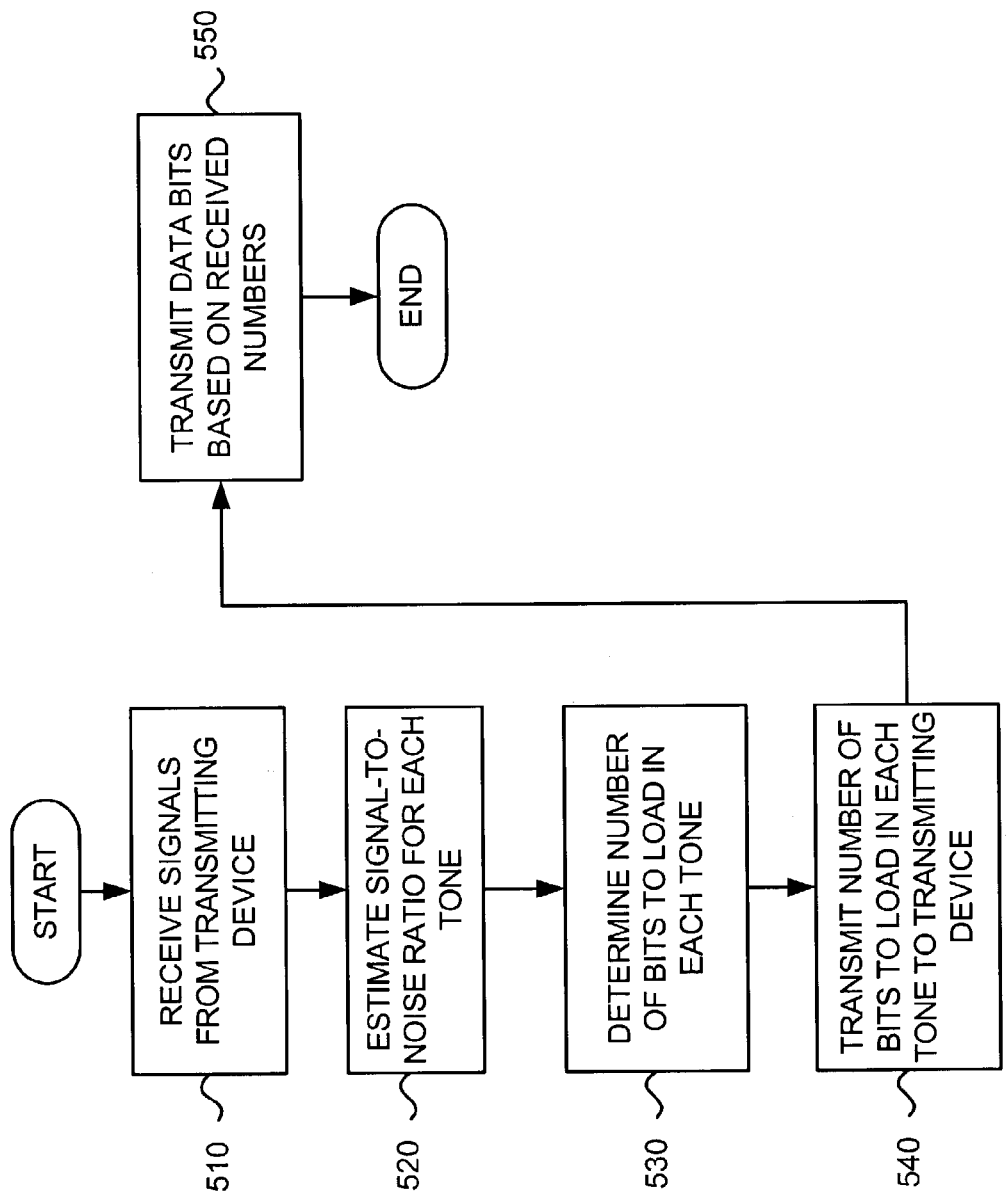
FIG. 5 illustrates an exemplary process for transmitting signals in an alternative implementation consistent with the principles of the present invention.

In an alternative implementation, it is desirable to allow transceivers, contained, for example, in communication interface 240, to adapt to the resolution of the transmitter's digital-to-analog (D/A) converter and the receiver's analog-to-digital (A/D) converter. FIG. 5 illustrates an exemplary process for transmitting signals in an alternative implementation consistent with the principles of the present invention. Processing may begin with a device, such as device 110, receiving signals (e.g., handshaking messages) from another device, such as device 130 as part of a training period (act 510). It will be appreciated that during this training period and prior to data transmission, devices 110 and 130 may exchange signals (e.g., handshaking messages) to learn about each other, select a data rate, and decide how the foregoing data transmissions will be performed. Device 130 may transmit the resolution of its D/A converter to device 110 during the training period. As will be described below, device 110 may determine the number of bits to load in each tone based in part on the resolution of the D/A converter of device 130.

During the training period, device 110 may estimate a signal-to-noise ratio for each received tone (act 520). To do so, device 110 may add the quantization noise resulting from the D/A converter of device 130 and the A/D converter from device 110 to the measured/estimated noise before estimating the signal-to-noise ratio for each tone. Once the signal-to-noise ratios have been determined, device 110 may determine the number of bits to load in each tone (act 530). It will be appreciated that a large number of bits can be assigned to those tones having a high signal-to-noise ratio, while few, if any, bits can be assigned to those tones having a low signal-to-noise ratio.

Once the number of bits to be loaded at each tone has been determined, device 110 may transmit this information to device 130 as part of the handshaking/training protocol (act 540). Device 130 may then transmit data bits to device 110 based on the received numbers (act 550). That is, device 130 may transmit a number of bits for each tone in correspondence with the numbers determined by device 110.

CONCLUSION

Systems and methods consistent with the principles of the present invention improve data transmissions in systems in which pilot sequences are used for timing recovery. In exemplary implementations, an optimum pilot sequence tone is selected based on signal-to-noise ratios and frequencies of the tones transmitted between a transmitting device and a receiving device. The transmitting device may then use the optimum tone for transmitting the pilot sequence. As a result, the likelihood that transmitted pilot sequences will be used effectively for timing recovery is greatly reduced.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while the above-description focused on a DMT environment, implementations consistent with the present invention are not so limited. In fact, one skilled in the art will appreciate that the above implementations are equally applicable to non-DMT environments.

While series of acts have been described with regard to FIGS. 4 and 5, the order of the acts may be varied in other implementations consistent with the present invention. Moreover, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A system for transmitting a pilot sequence in a transmission system, comprising:
   logic configured to adaptively select a tone on which the pilot sequence is transmitted based on one or more conditions in the transmission system,
   wherein, when adaptively selecting a tone, the logic is configured to:
      estimate a signal-to-noise ratio for each tone in a plurality of tones,
      determine an optimum tone by applying a function to each tone to obtain a function value and selecting a tone based on the function values, the function includes multiplying, for each tone, the signal-to-noise ratio for the tone by the square of a frequency associated with the respective tone, and
      transmit the pilot sequence on the determined optimum tone.

2. The system of claim 1 wherein the transmission system includes a discrete multi-tone transmission system.

3. The system of claim 1 wherein the estimating occurs during a training period.

4. A system for transmitting a pilot sequence in a transmission system, comprising:
   logic configured to adaptively select a tone on which the pilot sequence is transmitted, the tone being selected based on a function of a signal-to-noise ratio of the tone multiplied by the square of a frequency associated with the tone.

5. In a transmission system, a method for selecting a tone for transmitting a pilot sequence, the method comprising:
   estimating a signal-to-noise ratio for each tone in a plurality of tones;
   selecting an optimum tone by applying a function to each tone to obtain a function value and selecting the tone associated with an optimum function value as the optimum tone the optimum function value including the function value having a maximum value; and
   transmitting the pilot sequence on the selected optimum tone.

6. The method of claim 5 wherein the estimating occurs during a training period.

7. The method of claim 5 wherein the selecting includes:
   selecting the optimum tone based on the signal-to-noise ratio for each tone and a frequency associated with the tone.

8. The method of claim 5 wherein the estimating and the selecting are performed by a receiving device.

9. The method of claim 8 further comprising:
   transmitting information identifying the optimum tone to a transmitting device.

10. In a transmission system, a method for selecting a tone for transmitting a pilot sequence, the method comprising:
   estimating a signal-to-noise ratio for each tone in a plurality of tones;

selecting an optimum tone by applying a function to each tone to obtain a function value and selecting the tone associated with an optimum function value as the optimum tone, the function including multiplying the signal-to-noise ratio for each tone by the square of a frequency associated with the tone; and transmitting the pilot sequence on the selected optimum tone.

11. A method for identifying a tone at which a pilot sequence is to be transmitted, comprising:

receiving signals via a plurality of tones at a first device;

estimating a signal-to-noise ratio for each tone in the plurality of tones;

multiplying, for each tone the signal-to-noise ratio and a square of a frequency associated with the tone to obtain a resulting value; and selecting the tone associated with an optimum resulting value as a tone at which the pilot sequence is to be transmitted.

12. The method of claim 11 further comprising:

transmitting information identifying the selected tone to a second device.

* * * * *